US010834153B2

(12) United States Patent
Stockhammer et al.

(10) Patent No.: US 10,834,153 B2
(45) Date of Patent: Nov. 10, 2020

(54) SYSTEM LEVEL SIGNALING OF SEI TRACKS FOR MEDIA DATA STREAMING

(71) Applicant: QUALCOMM Incorporated, San Diego, CA (US)

(72) Inventors: Thomas Stockhammer, Bergen (DE); Ye-Kui Wang, San Diego, CA (US); Dmytro Rusanovskyy, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 214 days.

(21) Appl. No.: 15/684,676

(22) Filed: Aug. 23, 2017

(65) Prior Publication Data
US 2018/0063574 A1    Mar. 1, 2018

Related U.S. Application Data

(60) Provisional application No. 62/379,145, filed on Aug. 24, 2016.

(51) Int. Cl.
H04L 29/06          (2006.01)
H04N 21/6547        (2011.01)
(Continued)

(52) U.S. Cl.
CPC ........ H04L 65/4069 (2013.01); H04L 65/604 (2013.01); H04N 19/70 (2014.11); H04N 21/23614 (2013.01); H04N 21/4345 (2013.01); H04N 21/4348 (2013.01); H04N 21/4351 (2013.01); H04N 21/44 (2013.01);
(Continued)

(58) Field of Classification Search
CPC ............... H04N 21/4345; H04N 21/44; H04N 21/234327; H04N 21/236
See application file for complete search history.

(56) References Cited

U.S. PATENT DOCUMENTS 9,736,507 B2 *   8/2017 Oh ................. H04N 21/234327
2013/0060956 A1 * 3/2013 Nagaraj ............. H04N 21/4384
                                                       709/231
(Continued)

FOREIGN PATENT DOCUMENTS

WO    WO-2018039469 A1 *  3/2018  ......... H04L 65/4069

OTHER PUBLICATIONS

International Preliminary Report on Patentability from International Application No. PCT/US2017/048444, dated Nov. 6, 2018, 8 pp.
(Continued)

Primary Examiner — Kyung H Shin
(74) Attorney, Agent, or Firm — Shumaker & Sieffert, P.A.

(57) ABSTRACT

In one example, a device for retrieving media data includes one or more processors implemented in circuitry and configured to parse system level information of a media bitstream encapsulating a video elementary stream, the system level information indicating that the video elementary stream includes one or more supplemental enhancement information (SEI) messages and payload types for each of the SEI messages, extract the one or more SEI messages and the payload types from the system level information, and send the one or more SEI messages and the payload types to one or more other processing units of the device.

45 Claims, 5 Drawing Sheets

(51) Int. Cl.
| | |
|---|---|
| *H04N 21/434* | (2011.01) |
| *H04N 21/854* | (2011.01) |
| *H04N 21/6332* | (2011.01) |
| *H04N 19/70* | (2014.01) |
| *H04N 21/488* | (2011.01) |
| *H04N 21/643* | (2011.01) |
| *H04N 21/236* | (2011.01) |
| *H04N 21/435* | (2011.01) |
| *H04N 21/44* | (2011.01) |
| *H04L 29/08* | (2006.01) |

(52) U.S. Cl.
CPC ..... *H04N 21/4884* (2013.01); *H04N 21/6332* (2013.01); *H04N 21/64322* (2013.01); *H04N 21/6547* (2013.01); *H04N 21/85406* (2013.01); *H04L 67/02* (2013.01); *H04L 67/42* (2013.01)

(56) References Cited

U.S. PATENT DOCUMENTS

| | | | | |
|---|---|---|---|---|
| 2014/0003489 | A1* | 1/2014 | Hannuksela | H04N 19/70 375/240.02 |
| 2014/0086333 | A1* | 3/2014 | Wang | H04N 19/70 375/240.25 |
| 2017/0324981 | A1* | 11/2017 | Deshpande | H04N 19/70 |

OTHER PUBLICATIONS

Response to Written Opinion in International Application No. PCT/US2017/048444 filed Jun. 19, 2018, 5 pp.
Written Opinion issued in International Application No. PCT/US2017/048444 dated Aug. 6, 2018, 6 pp.
Hughes et al., "Common Media Application Format for Segmented Media, Proposed Revised Working Draft", Motion Picture Expert Group or ISO/IEC JTC1/SC29/WG11, No. m38228, Apr. 1, 2016, XP030066594, 88 pp.
International Search Report and Written Opinion of International Application No. PCT/US2017/048444, dated Nov. 15, 2017, 13 pp.
Stockhammer, "DASH Errata Issues", 110th MPEG Meeting; Oct. 20-24, 2014; Strasbourg; (Motion Picture Expert Group or ISO/IEC JTC1/SC29/WG11), No. M35151, Oct. 20, 2014, XP030063523, 9 pp.
Stockhammer et al., "Signalling SEI Messages on System Level", 116th MPEG Meeting; Oct. 17-21, 2016; Chengdu; (Motion Picture Expert Group or ISO/IEC JTC1/SC29/WG11), No. m39335, Oct. 15, 2016, XP030067681, 5 pp.
"Text of ISO/IEC 13818—15th edition", 109 MPEG Meeting; Sapporo; (Motion Picture Expert Group or ISO/IEC JTC1/SC29/WG11), No. N14561, Jul. 11, 2014, XP030021299, 241 pp.
Wang et al., "SEI messages on SEI Messages", 27th JCT-VC Meeting; Mar. 31-Apr. 7, 2017; Hobart; (Joint Collaborative Team on Video Coding of ISO/IEC JTC1/SC29/WG11 and ITU-T SG.16); JCTVC-AA0026, Mar. 21, 2017, XP030118192, 5 pp.
"Information Technology—Dynamic Adaptive Streaming Over HTTP (DASH) Part 1: Media Presentation Description and Segment Formats", International Standard, ISO/IEC 23009-1:2014 (E), 2nd Edition, May 15, 2014, 152 pp.
Singer et al., "ISO/IEC 14496-15/FDIS", International Organization for Standardization, ISO/IEC JTC1/SC29/WG11, Coding of Moving Pictures and Audio, MPEG03/N5780, Aug. 11, 2003, 34 pp.
Fielding et al., "Hypertext Transfer Protocol—HTTP/1.1", Network Working Group, Jun. 1999, RFC2616, Aug. 7, 2017, 152 pp.
Paila et al., "FLUTE—File Delivery over Unidirectional Transport", Internet Engineering Task Force (IETF),RFC 6726, Nov. 2012, 46 pp.
"High Dynamic Range Electro-Optical Transfer Function of Mastering Reference Displays", SMPTE ST 2084:2014, Aug. 16, 2014, 14 pp.
"Guidelines for Implementation: DASH-IF Interoperability Points", DASH Industry Forum, Version 3.3, Jun. 12, 2016, 152 pp.
"Common File Format & Media Formats Specification", Version 2.2, Digital Entertainment Content Ecosystem (DECE) LLC, Jul. 31, 2015, 202 pp.
"Requirements for the Common Media Application Format", International Organisation for Standardisation, ISO/IEC JTC1/SG29/WG11, Coding of Moving Pictures and Audio, MPEG 2016/N16144, Feb. 2016, 4 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.263, Series H: Audiovisual and Multimedia Systems, Infrastructure of audiovisual services—Coding of moving video, Video coding for low bit rate communication, The International Telecommunication Union, Jan. 2005, 226 pp.
"Parameter Values for Ultra-High Definition Television Systems for Production and International Programme Exchange", Recommendation ITU-R BT.2020-2, ITU-R Radiocommunication Sector of ITU, BT Series, Broadcasting service (television), Oct. 2015, 8 pp.
"Parameter Values for the HDTV Standards for Production and International Programme Exchange", Recommendation ITU-R BT.709-6, ITU-R Radiocommunication Sector of ITU, BT Series, Broadcasting service (television), Jun. 2015, 19 pp.
"Text of ETSI TS 103 433 v1.1.1" High-Performance Single Layer Directly, Standard Dynamic Range (SDR), Compatible High Dynamic Range (HDR), System for use in Consumer Electronics devices (SL-HDR1), DTS/JCT-036, Aug. 2016, 84 pp.
"Procedure for the allocation of ITU-T defined codes for non-standard facilities", Series T: Terminals for Telematic Services, ITU-T Telecommunication Standardization Sector of ITU, ITU-T Recommendation T.35, Feb. 2000, 15 pp.
"Text of ANSI/SCTE 128-1 2013", AVC Video Constraints for Cable Television Part 1—Coding, Society of Cable Telecommunications Engineers, Engineering Committee Digital Video Subcommittee, American National Standard, 32 pp.
"Information Technology—MPEG Systems Technologies—Part 8: Coding-Independent Code Points", International Standard, ISO/IEC 23001-8:2016 (E), Second Edition May 1, 2016, 44 pp.
"Dynamic Metadata for Color Volume Transform—Core Components", SMPTE ST 2094-1:2016, SMPTE Standard, May 18, 2016, 15 pp.
"Dynamic Metadata for Color Volume Transform—Application #2", SMPTE ST 2094-20:2016, SMPTE Standard, Jul. 6, 2016, 23 pp.
"Dynamic Metadata for Color Volume Transform—Application #3", SPMTE ST 2049-30:2016, SMPTE Standard, Jul. 6, 2016, 15 pp.
"Dynamic Metadata for Color Volume Transform—Application #4", SMPTE ST 2094-40:2016, SMPTE Standard, Aug. 24, 2016, 26 pp.
"Mastering Display Color Volume Metadata Supporting High Luminance and Wide Color Gamut Images", SMPTE ST 2086:2014, SMPTE Standard, Oct. 13, 2014, 6 pp.

\* cited by examiner

SYSTEM LEVEL SIGNALING OF SEI TRACKS FOR MEDIA DATA STREAMING

This application claims the benefit of U.S. Provisional Application No. 62/379,145, filed Aug. 24, 2016, the entire content of which is hereby incorporated by reference.

TECHNICAL FIELD

This disclosure relates to transport of encoded media data.

BACKGROUND

Digital media capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video encoding (e.g., compression) techniques, such as those described in the standards defined by MPEG-2, MPEG-4, ITU-T H.263 or ITU-T H.264/MPEG-4, Part 10, Advanced Video Coding (AVC), ITU-T H.265 (also referred to High Efficiency Video Coding (HEVC)), and extensions of such standards, to transmit and receive digital video information more efficiently.

After media data has been encoded, the media data may be packetized for transmission or storage. The media data may be assembled into a media file conforming to any of a variety of standards, such as the International Organization for Standardization (ISO) base media file format and extensions thereof.

SUMMARY

In general, this disclosure describes techniques for transmitting or receiving (e.g., generating or parsing) information at a system level of a media bitstream, the information representative of supplemental enhancement information (SEI) messages of a video elementary stream encapsulated by the media bitstream. The information may indicate one or more of presence of SEI messages for closed captions in the video elementary stream, whether a unit operating at the system level must be capable of rendering the closed captions, descriptive information for the closed captions, whether multiple sets of closed captions are present in the video elementary stream, mastering color volume information for a high dynamic range (HDR) format, content light level information for the HDR format, color remapping information (CRI) messages for the HDR format, or proprietary information for the HDR format.

In one example, a method of retrieving media data includes parsing, by a streaming client of a client device, system level information of a media bitstream encapsulating a video elementary stream, the system level information indicating that the video elementary stream includes one or more supplemental enhancement information (SEI) messages and payload types for each of the SEI messages, extracting, by the streaming client, the one or more SEI messages and the payload types from the system level information, and sending, by the streaming client, the one or more SEI messages and the payload types to one or more processing units of the client device.

In another example, a device for retrieving media data includes one or more processors implemented in circuitry and configured to parse system level information of a media bitstream encapsulating a video elementary stream, the system level information indicating that the video elementary stream includes one or more supplemental enhancement information (SEI) messages and payload types for each of the SEI messages, extract the one or more SEI messages and the payload types from the system level information, and send the one or more SEI messages and the payload types to one or more other processing units of the device.

In another example, a device for retrieving media data includes means for parsing system level information of a media bitstream encapsulating a video elementary stream, the system level information indicating that the video elementary stream includes one or more supplemental enhancement information (SEI) messages and payload types for each of the SEI messages, means for extracting the one or more SEI messages and the payload types from the system level information, and means for sending the one or more SEI messages and the payload types to one or more processing units of the device.

In another example, a computer-readable storage medium has stored thereon instructions that, when executed, cause a processor of a device to parse system level information of a media bitstream encapsulating a video elementary stream, the system level information indicating that the video elementary stream includes one or more supplemental enhancement information (SEI) messages and payload types for each of the SEI messages, extract the one or more SEI messages and the payload types from the system level information, and send the one or more SEI messages and the payload types to one or more processing units of the device.

In another example, a method of transmitting media data includes receiving, by an encapsulation unit of a content preparation device, a video elementary stream from a video encoder of the content preparation device, the video elementary stream including one or more supplemental enhancement information (SEI) messages, determining, by the encapsulation unit, payload types for each of the one or more SEI messages, encapsulating, by the encapsulation unit, the video elementary stream in a media bitstream, and generating, by the encapsulation unit, system level information for the media bitstream, the system level information indicating that the video elementary stream includes the one or more SEI messages and the payload types for each of the SEI messages.

In another example, a device for transmitting media data includes one or more processors implemented in circuitry and configured to receive a video elementary stream from a video encoder, the video elementary stream including one or more supplemental enhancement information (SEI) messages, determine payload types for each of the one or more SEI messages, encapsulate the video elementary stream in a media bitstream, and generate system level information for the media bitstream, the system level information indicating that the video elementary stream includes the one or more SEI messages and the payload types for each of the SEI messages.

In another example, a device for transmitting media data includes means for receiving a video elementary stream from a video encoder, the video elementary stream including one or more supplemental enhancement information (SEI) messages, means for determining payload types for each of the one or more SEI messages, means for encapsulating the video elementary stream in a media bitstream, and means for generating system level information for the media bitstream, the system level information indicating that the video elementary stream includes the one or more SEI messages and the payload types for each of the SEI messages.

In another example, a computer-readable storage medium having stored thereon instructions that, when executed, cause a processor to receive a video elementary stream from a video encoder, the video elementary stream including one or more supplemental enhancement information (SEI) messages, determine payload types for each of the one or more SEI messages, encapsulate the video elementary stream in a media bitstream, and generate system level information for the media bitstream, the system level information indicating that the video elementary stream includes the one or more SEI messages and the payload types for each of the SEI messages.

The details of one or more examples are set forth in the accompanying drawings and the description below. Other features, objects, and advantages will be apparent from the description and drawings, and from the claims.

DETAILED DESCRIPTION

Figure 1:
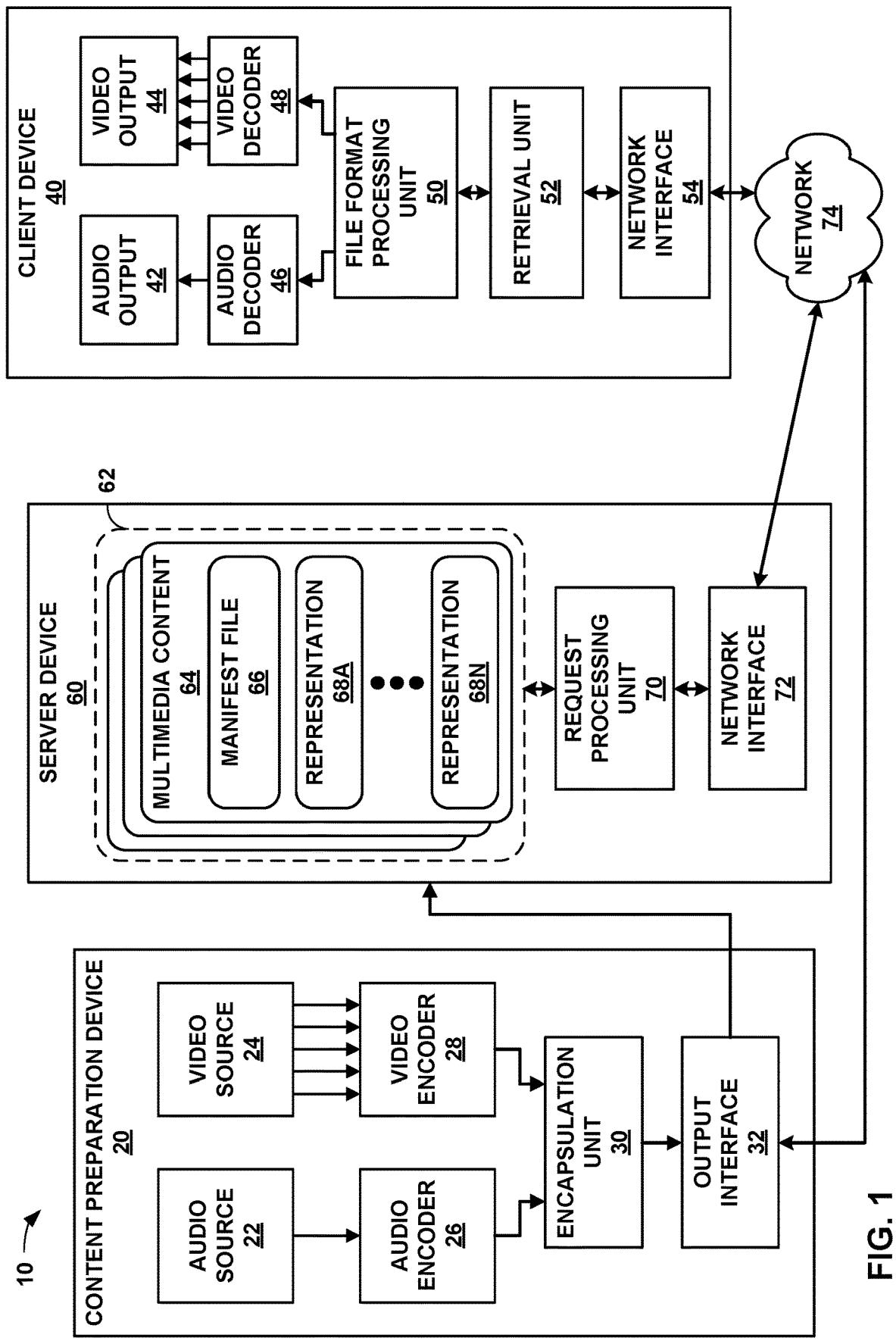
FIG. 1 is a block diagram illustrating an example system that implements techniques for streaming media data over a network.

In general, this disclosure describes techniques for signaling supplemental enhancement information (SEI) message data at a System level when transporting media data. The System level may generally correspond to network abstraction layer (NAL) units and encapsulated NAL units, which may be transported via a network. For example, the System level may correspond to MPEG-2 Systems (e.g., MPEG-2 Transport Stream (TS)), MPEG Media Transport (MMT), and/or Dynamic Adaptive Streaming over HTTP (DASH).

NAL units can be categorized to Video Coding Layer (VCL) NAL units and non-VCL NAL units. VCL units may contain the core compression engine and may include block, macroblock, coding unit (CU), and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

SEI messages may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points.

Parameter sets, such as PPSs and SPSs, may include video usability information (VUI). VUI generally provides information about timing for pictures, e.g., when pictures should be decoded and presented. VUI may also provide other data related to the display of decoded pictures, such as aspect ratios, color primaries, and the like. Furthermore, VUI may indicate information such as profile, tier, and level information, which generally indicates which coding tools are to be enabled or disabled for coding the corresponding video data.

Thus, SEI and VUI are sets of information that can be inserted into a video bitstream to enhance the use of video data in the video bitstream for a wide variety of purposes. SEI messages may, for example, contain information on the display and rendering of the signal. Various examples of SEI messages have been defined in ITU-T H.264/AVC (Advanced Video Coding) and ITU-T H.265/High Efficiency Video Coding (HEVC). SEI message types are identified by a payload type index defined in the relevant video coding specification (e.g., H.264 or H.265). SEI messages may even be used to deliver private user data by registration, so significant amount of information may be delivered. SEI messages may contain important information. If this information is present, then either a media engine is able to access the data or a media engine client is permitted to access the data.

There may be cases in which the Systems layer needs to parse SEI messages and extract information from the SEI messages for proper operation. However, absent the techniques of this disclosure, there is no current way to signal, at the Systems layer, if a video elementary stream contains certain SEI messages and if a client is required to process information in SEI messages in order to be able to access the system.

When streaming media data, various types of media data may be included in the media stream, such as audio, video, and/or timed text (or closed captions). Timed text/closed caption data signaling may be performed according to various standards such as, for example, CEA-608, CEA-708, and EIA-608. The presence of closed captions and their carriage within an SEI message of a video track is defined in ANSI/SCTE 128-1 2013, section 8.1 Encoding and transport of caption, active format description (AFD) and bar data. Such signaling may indicate that a video track may include SEI messages that carry CEA-608/708 closed captions. The SEI message syntax element payload_type, having a value of 4, is used to indicates that Rec. ITU-T T.35-based SEI messages are in use. Signalling of the presence of captions on system level is quite relevant for regulatory issues in certain cases. DASH-IF has defined a way to signal this in a DASH MPD (see DASH-IF IOP Guidelines Clause 6.4.3), but this is not available in other systems.

Common Media Application Format, clause 9.5 "Video Elementary Stream Embedded Captions," says:

The MPEG File Systems group is specifying a method of signaling the presence of caption data in video SEI NAL units in ISOBMFF, and a planned amendment to Part 30. The amendment is expected to be available for reference here when CMAF is published.

It is recommended that Manifest signal the presence of SEI-stored closed captions, and the services and languages included. Players may automatically select Tracks signaled to contain captions if the user or Player indicates a preference for audio accessibility Hence, there is a gap between providing this signalling in a file format level and the System level. In certain cases, devices operating at the System level have to extract the SEI messages for rendering, as would be done, for example, in the DASH client case. Therefore, System level information is important.

This disclosure recognizes that conventional techniques for streaming media data are missing the following:

A signal at the file format level that indicates:
  The presence of SEI messages for CEA-608/708 in the video elementary stream,
  That the system level must be capable to render the captions,
  Additional information, such as language of the captions or other information that are included in the SEI message, and
  That multiple captions (e.g. for different languages) may be present.
A signal at the MPD/DASH/SYSTEM level to support all of the above.
A signal at the MPEG-2 TS level to support all of the above.
A signal at the MMT System level to support all of the above.

The arrival of Ultra HD and High Dynamic Range (HDR) technologies has brought several different media formats, and metadata describing them, to the video coding community. Example characteristics in which HDR differs from standard dynamic range (SDR) are: color primaries (BT.2020 or P3 is used instead of BT.709), transfer characteristic (SMPTE ST 2084 (PQ) or HLG is used instead of BT.709), and color transfer matrix (BT.2020 or XYZ is used instead of BT.709). These are typically signaled though VUI information in video elementary streams, and there are existing ways of propagating this to the MPD level using Coding-Independent Code Points (CICP) messages, e.g., according to ISO/IEC 23001-8:2016. HDR techniques may include, for example, wide color gamut (WCG).

For example, to signal the use of BT.2020 primaries and transfer function (VUI codes 9) and PQ transfer characteristic (VUI code 14), a content preparation device can attach the following properties to an AdaptationSet:

<SupplementalProperty schemeIdUri="urn:mpeg:mpegB:cicp:ColorPrimaries" value="9"/>
  <SupplementalProperty schemeIdUri="urn:mpeg:mpegB:cicp:TransferCharacteristics" value="14"/>
  <SupplementalProperty schemeIdUri="urn:mpeg:mpegB:cicp:MatrixCoefficients" value="9"/>

This mechanism relies on supplemental properties and CICP descriptors defined by MPEG.

Additional SEI messages may be provided for HDR. Such SEI messages may indicate additional characteristics, such as information that may be important for some HDR formats. Such information may include mastering color volume information, e.g., as defined by ST 2086, and/or content light level information, such as MaxFALL and/or MaxCLL parameters. The SEI messages for HDR may also include color remapping information (CRI) messages and/or proprietary messages, such as those defined in ETSI TS 103 433 or ETSI CCM ISG. Furthermore, the SEI messages for HDR may include mastering color volume information to establish mapping between gamma-domain color values and intended light levels in reproduction domain, and/or content light level information, which may be used to determine to which extent such mapping may be possible given display and content characteristics.

Several industry organizations have proposed prescribing a so-called "HDR-10" format. These organizations include Blu-ray Disc Association, DECE, and Ultra HD Forum. There are also instances of formats created without such metadata being present. If this metadata is absent, perceptual quantization (PQ) values are assumed to be directly related to light intensity levels, which may require different rendering. Ultra HD Forum classifies this variation of UHD formats as "PQ10".

Different display technologies (e.g., LCD, AMOLED, and the like) may effectively reproduce different light ranges. Some dynamic backlight LCD displays can provide several thousand nits, while others are limited by a few hundred. The black level, reflectivity, and effective contrast of displays also differ significantly between display technologies. Displays also vary in their gamut, white point, native EOTF, and capabilities of interface. Furthermore, display technologies may support various data formats and interface capabilities.

Given variation of both formats and also display and interface capabilities, some functions of selection/targeting of content for playback will naturally fall on a logic system layer. For example, when receiving UHD content, a DASH player may need to be configured to determine whether content can be rendered properly given available display and the interface to the display, select an appropriate set of HDR-mastered content from a plurality of available sets of HDR-mastered content (where the appropriate set may be the one that will be reproduced the best on the available display), determine if the use of SDR would be better than HDR if an SDR stream is present (e.g., considering capabilities of the display), and other such considerations.

The techniques of this disclosure may be applied to video files conforming to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more Periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

FIG. 1 is a block diagram illustrating an example system 10 that implements techniques for streaming media data over a network. In this example, system 10 includes content preparation device 20, server device 60, and client device 40 (210). Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming.

In addition, encapsulation unit 30 may form a manifest file, such as a media presentation description (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In accordance with the techniques of this disclosure, encapsulation unit 30 may provide, and retrieval unit 52 may receive, Coding-Independent Code Points (CICP) messages including signaled information representative of data included in an encapsulated video bitstream. For example, the CICP messages may indicate any or all of the following: whether SEI messages for CEA-608/708 are included in a video elementary stream, whether the System level must be able to render closed captions, languages of the closed captions or other information otherwise included in the SEI messages, and/or whether multiple closed captions (e.g., for different languages) are present. Additionally or alternatively, the CICP messages may include signaling representative of mastering color volume information, content light level information, CRI messages, mapping information for mastering color volume information, and/or proprietary messages that are included in SEI messages for HDR.

By using CICP messages in this way, signaled data may be independent of a codec used to code corresponding media data. In addition, the CICP messages may be included in, e.g., manifest file 66. The CICP messages can be used to support essentiality and supplemental information. The CICP messages can also define detailed semantics for this information. This disclosure recognizes, however, that CICP messages may be specific to metadata, might not cover SEI messages, and are generally not used for signaling at the file format level (e.g., in ISO BNFF file format information).

In addition or in the alternative, encapsulation unit 30 may provide and retrieval unit 30 may receive DASH descriptors in accordance with ISO/IEC 23009-1. Such descriptors may include signaled information representative of data included in an encapsulated video bitstream. For example, the DASH descriptors may indicate any or all of the following: whether SEI messages for CEA-608/708 are included in a video elementary stream, whether the System level must be able to render closed captions, languages of the closed captions or other information otherwise included in the SEI messages, and/or whether multiple closed captions (e.g., for different languages) are present. Additionally or alternatively, the DASH descriptors may include signaling representative of mastering color volume information, content light level information, CRI messages, mapping information for mastering color volume information, and/or proprietary messages that are included in SEI messages for HDR.

By using DASH descriptors in this way, signaled data may be independent of a codec used to code corresponding media data. In addition, the DASH descriptors may be signaled in DASH MPDs (which may correspond to manifest file 66). The DASH descriptors can be used to support essentiality and supplemental information. The DASH descriptors can also define detailed semantics in DASH for this information. This disclosure recognizes, however, that DASH descriptors do not cover all SEI messages, are generally not used for signaling at the file format level (e.g., in ISO BMFF file format information), are specific to DASH only, and are not expected to be broadly available.

In addition or in the alternative, encapsulation unit 30 may provide and retrieval unit 30 may receive sample entry information as part of file format data, e.g., in ISO BMFF file format information for DASH segments or other such streamed files. Such sample entry information may be added to AVC or HEVC file format in formation (e.g., according to ISO/IEC 14496-15) as a sample entry with the detailed ability to signal carried SEI payloads, and each payload can define more details about what else is to be added.

Such sample entry information may be independent of a codec used to code corresponding media data. The sample entry information may be signaled in DASH MPDs (which may correspond to manifest file 66). Such sample entry information may cover all existing and future SEI messages. The sample entry information would not necessarily allow signaling of information on the file format level and DASH level though the @codecs parameter. This disclosure recognizes, however, that the sample entry information might not be used to support essentiality and supplemental information, and may be complex to define in specification text.

In addition or in the alternative, encapsulation unit 30 may provide and retrieval unit 30 may receive a string syntax that signals one or more of: that an elementary stream contains one or more SEI messages payload types, that each contained payload type is signaled, for each type the option of user defined fields that can be used to signal additional information (preferably on a very simple basis, e.g., specify some static contained information), and/or payload type 4 on user defined data. Such information may be signaled on the file format level. This signal may also be inherited by the system layer, e.g., in the DASH MPD (or manifest file 66 generally).

Furthermore, in order to generate the system level information discussed above, encapsulation unit 30 may determine which SEI messages are included in the video elementary stream, as well as payload types for the SEI messages, and generate the system level information to indicate the SEI messages included in the video elementary stream. Likewise, retrieval unit 52 may determine capabilities of client device 40 (e.g., whether client device 40 is able to use the data of the SEI messages), and select an appropriate media stream (e.g., an adaptation set and/or representation of an adaptation set) based on the capabilities and the signaled information of the SEI messages as indicated by the system level information.

The system level information discussed above, alone or in any combination, may indicate what SEI messages are (or may be) present in the bitstream or elementary stream. Such system level information may include, for example, a number of types of SEI messages that are (or may be) present and/or an array of SEI message types. Each type may be represented by, for example, a 16-bit non-negative integer, or a value coded with variable length.

In coded video bitstreams, the information on what SEI messages are (or may be) present in the video bitstream may be signaled in, e.g., a parameter set, such as a video parameter set (e.g., as specified in HEVC), a sequence parameter set (e.g., as specified in HEVC or H.264/AVC), or a sequence-level SEI message.

In file formats, DASH MPD, MPEG-2 TS, and/or MMT, the information indicating what SEI messages are (or may be) present in a video elementary bitstream in a track may be signaled in one or more of: a new box, e.g., an "SeiMsgInfoBox," which can be included in a visual sample entry, e.g., as an optional box, a new optional MIME parameter, e.g., named "seimsgtypes," and this box can be included as part of the "codecs" parameter or in parallel with it, which in turn can be included in a DASH MPD or other manifest file, a new or existing DASH MPD element or descriptor at an adaptation set or a representation level, a new or existing sequence-level MPEG-2 TS descriptor, and/or a new or existing sequence-level MMT descriptor.

Various types of SEI messages may be included in the bitstream. The SEI messages may include, for example, SEI messages having information for HDR and/or WCG. Characteristics that may be signaled in the SEI messages, and therefore in the system level information according to the techniques of this disclosure, may additionally or alternatively include any or all of the following: mastering color volume information, e.g., as defined by ST 2086 (which may include color primaries of the mastering display and white point (description of the content) and/or minimum and/or maximum values of luminance of the mastering display (description of the content)), content light level information (e.g., MaxFALL and/or MaxCLL parameters, which may represent a maximum light level for given segment of the content (description of the content) and/or a maximum average-frame light level for given segment of the content (description of the content)), color remapping information, e.g., as defined in HEVC (e.g., primaries of the target representation (description of the output), transfer characteristics of the target representation (description of the output), and/or color remap ID (description of the application ID in some ecosystem)), and/or HDR dynamic metadata for color volume transforms, e.g., as defined in ST 2094-10,20,30,40 (which may include color primaries and min/max peak luminance of the target display (description of the output)).

In one example, there may be multiple SEI entities in a bitstream. Each SEI may target different display capabilities. Parameters encapsulated in the SEI messages may be made available at system level, in accordance with the techniques of this disclosure. That is, encapsulation unit 30 may provide, and retrieval unit 52 may receive, any or all of the information otherwise included in the SEI messages at the system level. Thus, an end device, such as client device 40, may select an appropriate bitstream (e.g., one of representations 68) based on the system level information representing the SEI message information, such that the selected bitstream has characteristics that match capabilities of, e.g., video output 44.

In another example, there may be a single SEI entity in a bistream, e.g., in a system having a feedback channel. A single bitstream may be available at the encoder side (e.g., at server device 60 or content preparation device 20). Based on decoder capabilities (e.g., capabilities of video decoder 48) provided through the feedback channel (and received by, e.g., server device 60), a video encoder (such as video encoder 28) may encapsulate data of bistream SEI messages, to provide adaptation according to the decoder capabilities. Parameters of the SEI messages may be signaled at the system level, in accordance with the techniques of this disclosure.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to file format processing unit 50. File format processing unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and file format processing unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or file format processing unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to file format processing unit 50, via retrieval unit 52. File format processing unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

In this manner, content preparation device 20 and/or server device 60 represent examples of a device for transmitting media data that includes one or more processors implemented in circuitry and configured to receive a video elementary stream from a video encoder, the video elementary stream including one or more supplemental enhancement information (SEI) messages, determine payload types for each of the one or more SEI messages, encapsulate the video elementary stream in a media bitstream, and generate system level information for the media bitstream, the system level information indicating that the video elementary stream includes the one or more SEI messages and the payload types for each of the SEI messages.

Similarly, client device 40 represents an example of a device for retrieving media data includes means for parsing system level information of a media bitstream encapsulating a video elementary stream, the system level information indicating that the video elementary stream includes one or more supplemental enhancement information (SEI) messages and payload types for each of the SEI messages, means for extracting the one or more SEI messages and the payload types from the system level information, and means for sending the one or more SEI messages and the payload types to one or more processing units of the device.

Figure 2:
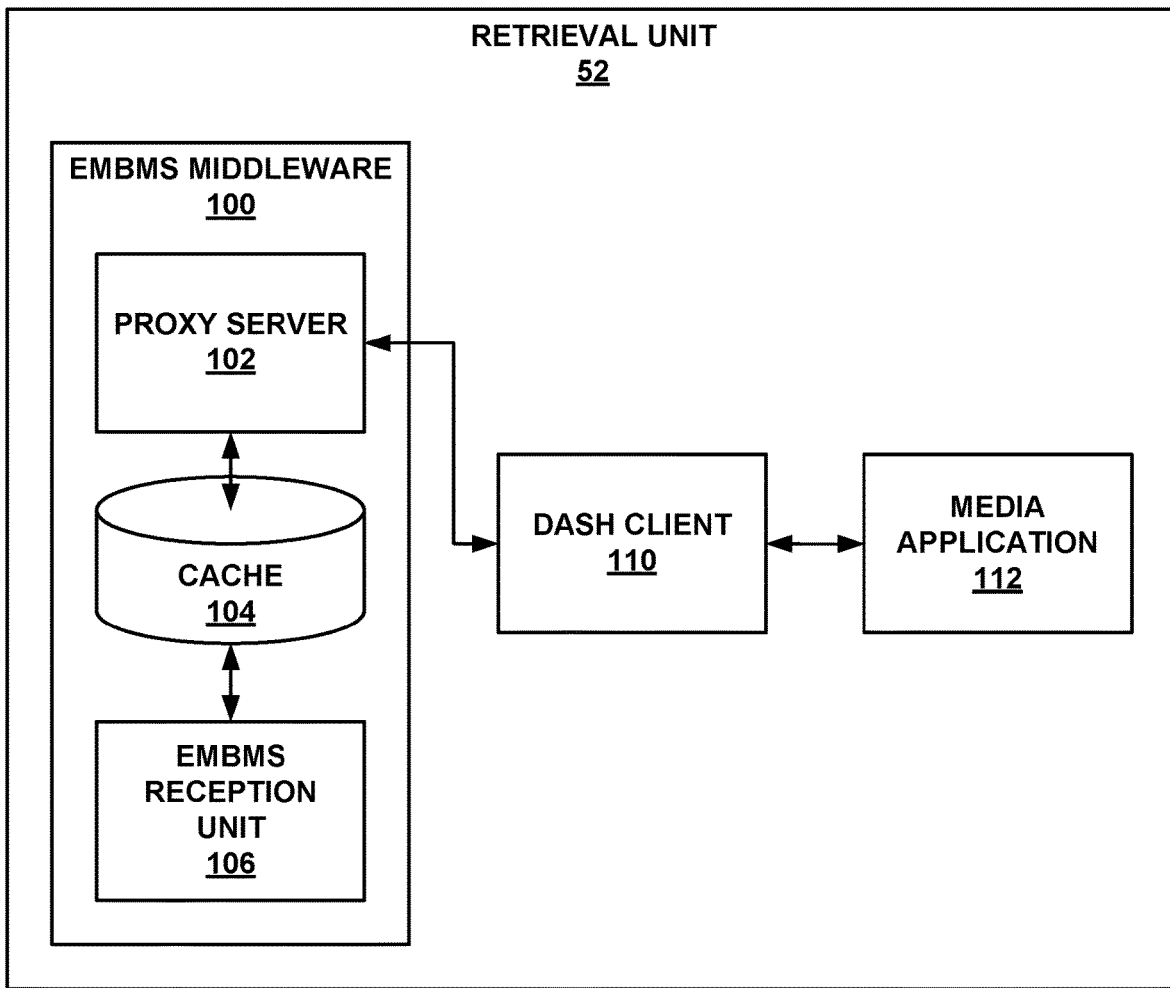
FIG. 2 is a block diagram illustrating an example set of components of a retrieval unit.

FIG. 2 is a block diagram illustrating an example set of components of retrieval unit 52 of FIG. 1 in greater detail. In this example, retrieval unit 52 includes eMBMS middleware unit 100, DASH client 110, and media application 112.

In this example, eMBMS middleware unit 100 further includes eMBMS reception unit 106, cache 104, and server unit 102. In this example, eMBMS reception unit 106 is configured to receive data via eMBMS, e.g., according to File Delivery over Unidirectional Transport (FLUTE), described in T. Paila et al., "FLUTE—File Delivery over Unidirectional Transport," Network Working Group, RFC 6726, November 2012, available at http://tools.ietf.org/html/rfc6726. That is, eMBMS reception unit 106 may receive files via broadcast from, e.g., server device 60, which may act as a BM-SC.

As eMBMS middleware unit 100 receives data for files, eMBMS middleware unit may store the received data in cache 104. Cache 104 may comprise a computer-readable storage medium, such as flash memory, a hard disk, RAM, or any other suitable storage medium.

Local server unit 102 may act as a server for DASH client 110. For example, local server unit 102 may provide a MPD file or other manifest file to DASH client 110. Local server unit 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from local server unit 102 using HTTP GET or partial GET requests. For example, for a segment available from link http://127.0.0.1/repl/seg3, DASH client 110 may construct an HTTP GET request that includes a request for http://127.0.0.1/repl/seg3, and submit the request to local server unit 102. Local server unit 102 may retrieve requested data from cache 104 and provide the data to DASH client 110 in response to such requests.

Figure 3:
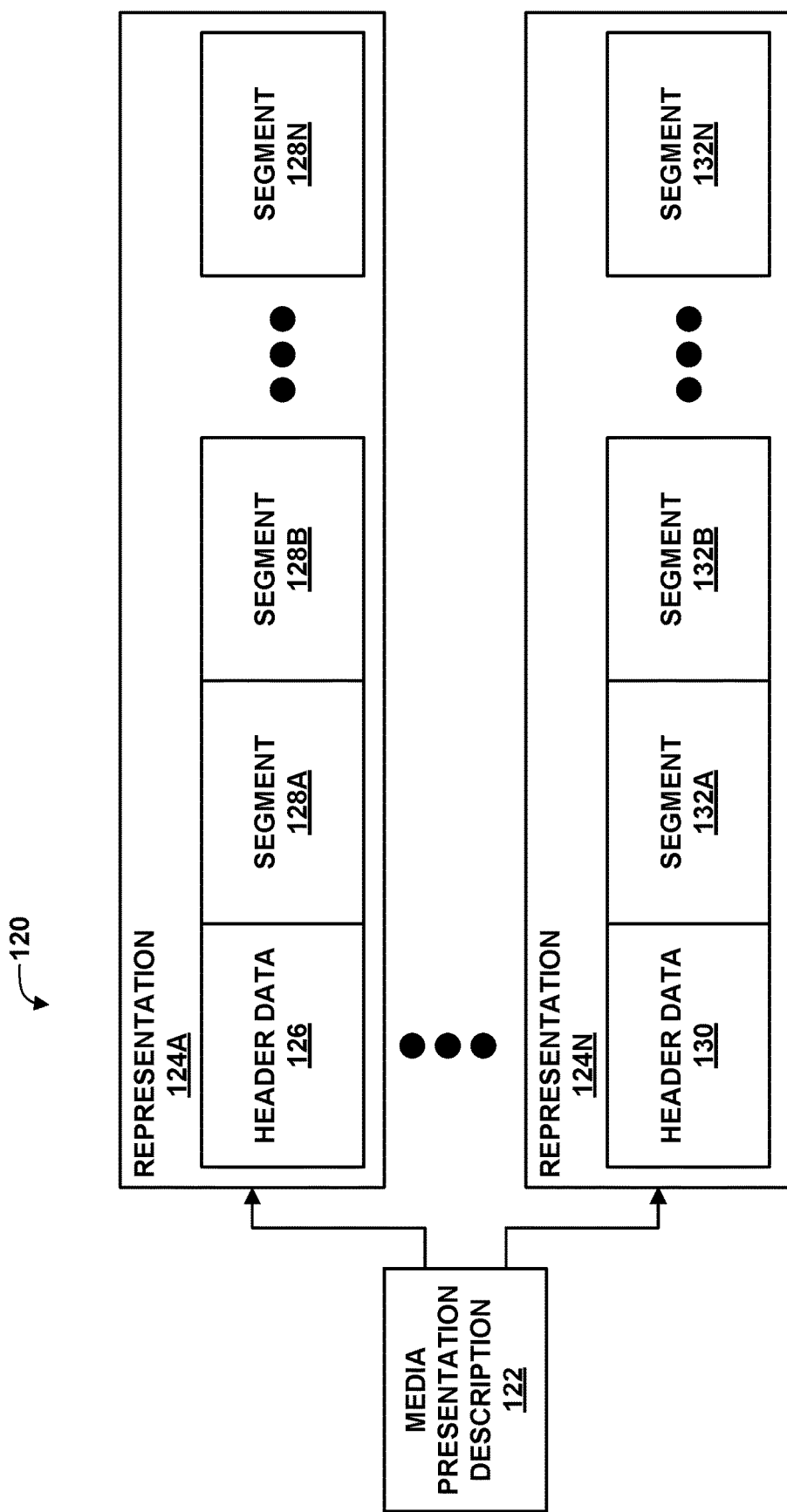
FIG. 3 is a conceptual diagram illustrating elements of example multimedia content.

FIG. 3 is a conceptual diagram illustrating elements of example multimedia content 120. Multimedia content 120 may correspond to multimedia content 64 (FIG. 1), or another multimedia content stored in storage medium 62. In the example of FIG. 3, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 2. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 3. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

In accordance with the techniques of this disclosure, MPD 122 may include system level information representative of supplemental enhancement information (SEI) messages of respective video elementary streams encapsulated by respective representations 124. For example, MPD 122 may include one or more of CICP messages, DASH descriptors, or a string including syntax elements. The information may represent one or more of presence of SEI messages for closed captions in the video elementary streams, whether a unit operating at the system level must be capable of rendering the closed captions, descriptive information for the closed captions, whether multiple sets of closed captions are present in the video elementary stream, mastering color volume information for a high dynamic range (HDR) format, content light level information for the HDR format, color remapping information (CRI) messages for the HDR format, or proprietary information for the HDR format.

Figure 4:
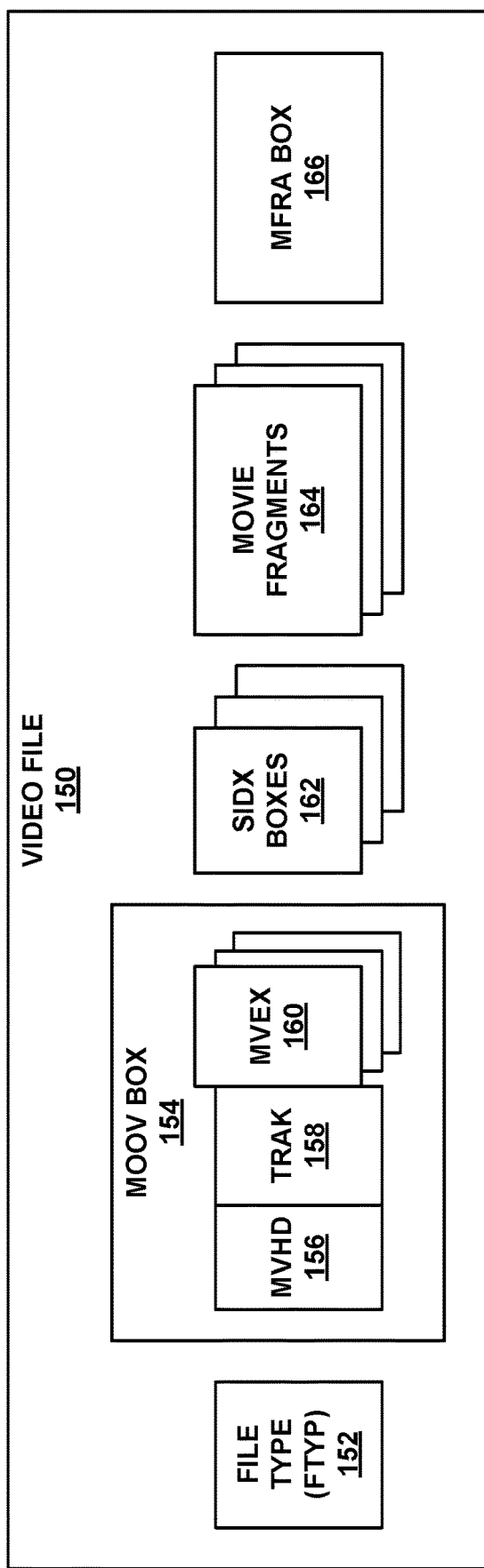
FIG. 4 is a block diagram illustrating elements of an example video file, which may correspond to a segment of a representation.

FIG. 4 is a block diagram illustrating elements of an example video file 150, which may correspond to a segment of a representation, such as one of segments 114, 124 of FIG. 3. Each of segments 128, 132 may include data that conforms substantially to the arrangement of data illustrated in the example of FIG. 4. Video file 150 may be said to encapsulate a segment.

As described above, video files in accordance with the ISO base media file format and extensions thereof store data in a series of objects, referred to as "boxes." In the example of FIG. 4, video file 150 includes file type (FTYP) box 152, movie (MOOV) box 154, segment index (sidx) boxes 162, movie fragment (MOOF) boxes 164, and movie fragment random access (MFRA) box 166. Although FIG. 4 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150. FIG. 7, discussed in greater detail below, provides additional information with respect to the MPD update box.

MOOV box 154, in the example of FIG. 4, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 3) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units which contains the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 4). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

In accordance with the techniques of this disclosure, video file 150 may include system level information representative of supplemental enhancement information (SEI) messages of a video elementary stream. In general, movie fragments 164 represent respective portions of the video elementary stream. The system level information representative of the SEI messages may be included in, for example, MOOV box 154 or a separate box (not shown) of video file 150.

Figure 5:
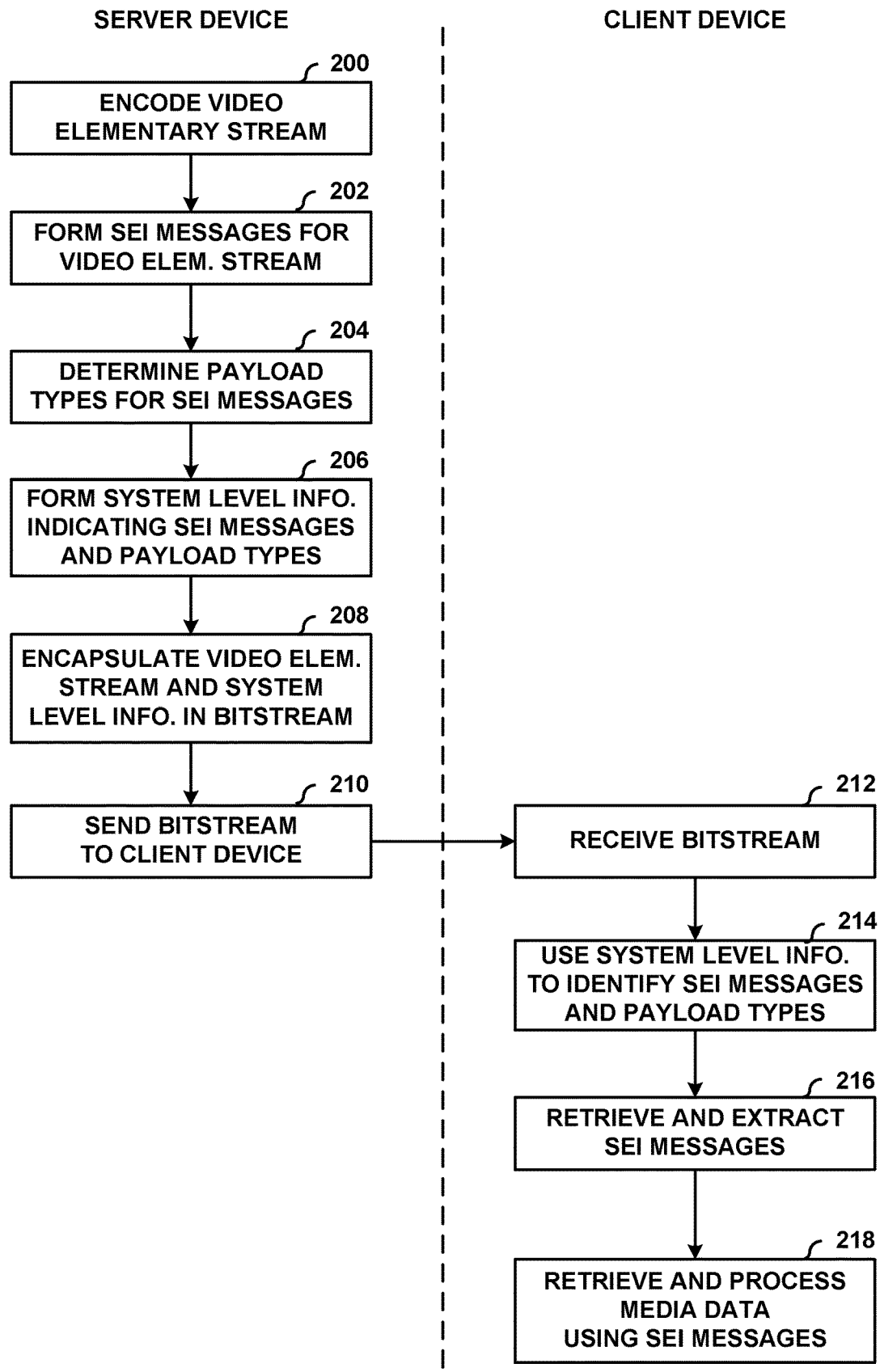
FIG. 5 is a flowchart illustrating an example method for transporting media data in accordance with the techniques of this disclosure.

FIG. 5 is a flowchart illustrating an example method for transporting media data in accordance with the techniques of this disclosure. For purposes of explanation and example, the method of FIG. 5 is explained with respect to content preparation device 20 and client device 40 of FIG. 1. However, it should be understood that other devices may be configured to perform this or a similar method, in other examples. For example, server device 60 may perform the method of FIG. 5. Additionally, as noted above, the functionality of server device 60 and content preparation device 20 of FIG. 1 may be integrated into a single device.

Initially, content preparation device 20 may encode a video elementary stream (200). Alternatively, content preparation device 20 may encode the video elementary stream and send the encoded video elementary stream to content preparation device 20. Content preparation device 20 may also form SEI messages for the video elementary stream (202). Formation of the SEI messages may be part of the encoding process, or a separate process. Content preparation device 20 may further determine payload types for the SEI messages (204), e.g., based on a relevant video coding standard.

For example, content preparation device 20 may form the system level information to indicate any or all of presence of SEI messages for closed captions in the video elementary stream, whether a unit operating at the system level must be capable of rendering the closed captions, descriptive information for the closed captions, whether multiple sets of closed captions are present in the video elementary stream, mastering color volume information for a high dynamic range (HDR) format, content light level information for the HDR format, color remapping information (CRI) messages for the HDR format, or proprietary information for the HDR format.

Content preparation device 20 may then form system level (e.g., MPEG-2 Systems level or file format level) information indicating that the SEI messages are included in the video elementary stream, and the payload types for the SEI messages (206). Content preparation device 20 may then encapsulate the video elementary stream and the system level information in a bitstream (208), such as a file conforming to a file format. Content preparation device 20 may then send the bitstream, or a portion thereof, to client device 40. For example, the portion of the bitstream may be a portion including the system level information indicating that the SEI messages are present in the video elementary stream and payload types for the SEI messages. To send the bitstream, content preparation device 20 may first send the bitstream to server device 60, and server device 60 may ultimately send the bitstream, or portion thereof, to client device 40 in response to, e.g., HTTP GET or partial GET requests from client device 40.

Client device 40 may then receive the bitstream or portion thereof (212). Client device 40 may parse the bitstream (or portion thereof) to extract the system level information indicative of the SEI messages and the payload types for the SEI messages. The system level information may be included in one or more Coding-Independent Code Points (CICP) messages, and thus, client device 40 may parse the one or more CICP messages to extract the system level information. In some examples, the CICP messages, or other system level information, may be included in a manifest file, such as a media presentation description (MPD). In some examples, the system level information may be included in DASH descriptors of system level information and/or file format information.

Client device 40 may use the system level information of the bitstream to identify the SEI messages and payload types for the SEI messages (214), and ultimately, retrieve and extract the SEI messages from the video elementary stream (216). For example, the bitstream received by client device 40 may include the SEI messages, or alternatively, client device 40 may use a particular request (e.g., HTTP GET or partial GET) to specifically retrieve the SEI messages.

Client device 40 may then retrieve and process media data of the video elementary stream using the SEI messages (218). In some examples, client device 40 may initially determine whether the video elementary stream is appropriate for client device 40 using the SEI messages, e.g., whether the video elementary stream can be properly rendered or whether the video elementary stream is better than other video elementary streams based on rendering capabilities of client device 40. Thus, if the video elementary stream is appropriate for client device 40, client device 40 may retrieve the video elementary stream, but if the video elementary stream is not appropriate (or if a different video elementary stream is more appropriate for client device 40), client device 40 may retrieve a different (more appropriate) video elementary stream. Thus, client device 40 may use the system level information to determine whether to retrieve a remaining portion of the bitstream.

Furthermore, client device 40 may use the SEI messages during rendering or other processes following decoding of the media data of the video elementary stream, according to conventional uses of SEI messages, as well. In particular, file format processing unit 50 of client device 40 may extract the SEI messages and send the SEI messages to appropriate units of client device 40, such as video decoder 48 and/or video output 44, which may render decoded video data using the SEI messages.

In this manner, the method of FIG. 5 represents an example of a method of retrieving media data, the method including parsing, by a streaming client of a client device, system level information of a media bitstream encapsulating a video elementary stream, the system level information indicating that the video elementary stream includes one or more supplemental enhancement information (SEI) messages and payload types for each of the SEI messages, extracting, by the streaming client, the one or more SEI messages and the payload types from the system level information, and sending, by the streaming client, the one or more SEI messages and the payload types to one or more processing units of the client device.

Likewise, the method of FIG. 5 also represents an example of a method of transmitting video data, the method including receiving, by an encapsulation unit of a content preparation device, a video elementary stream from a video encoder of the content preparation device, the video elementary stream including one or more supplemental enhancement information (SEI) messages; determining, by the encapsulation unit, payload types for each of the one or more SEI messages, encapsulating, by the encapsulation unit, the video elementary stream in a media bitstream, and generating, by the encapsulation unit, system level information for the media bitstream, the system level information indicating that the video elementary stream includes the one or more SEI messages and the payload types for each of the SEI messages.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of retrieving media data, the method comprising:

parsing, by a streaming client of a client device, system level information of a media bitstream encapsulating a video elementary stream in a video track, the system level information indicating that the video elementary stream includes one or more supplemental enhancement information (SEI) messages and the system level information further indicating payload types for each of the SEI messages, and the system level information being separate from the video track;

extracting, by the streaming client, the one or more SEI messages from the video elementary stream and the payload types from the system level information; and sending, by the streaming client, the one or more SEI messages and the payload types to one or more processing units of the client device.

2. The method of claim 1, wherein the system level information indicates one or more of presence of SEI messages for closed captions in the video elementary stream, whether a unit operating at the system level must be capable of rendering the closed captions, descriptive information for the closed captions, whether multiple sets of closed captions are present in the video elementary stream, mastering color volume information for a high dynamic range (HDR) format, content light level information for the HDR format, color remapping information (CRI) messages for the HDR format, or proprietary information for the HDR format.

3. The method of claim 1, further comprising determining, by the streaming client, whether to retrieve the media bitstream based on the system level information.

4. The method of claim 1, wherein the system level information comprises information in one or more of a file format level for a file encapsulating video data of the video elementary stream included in the media bitstream, a manifest file for the media bitstream, an MPEG-2 Transport Stream (TS) level of the media bitstream, a MPEG Media Transport (MMT) level of the media bitstream, or a Dynamic Adaptive Streaming over HTTP (DASH) level of the media bitstream.

5. The method of claim 1, wherein parsing the system level information comprises parsing one or more Coding-Independent Code Points (CICP) messages including the system level information.

6. The method of claim 5, wherein parsing the CICP messages comprises parsing a media presentation description (MPD) including the CICP messages.

7. The method of claim 1, wherein parsing the system level information comprises parsing a media presentation description (MPD) including one or more Dynamic Adaptive Streaming over HTTP (DASH) descriptors including the system level information.

8. The method of claim 1, wherein parsing the system level information comprises parsing sample entry information included in file format data, the sample entry information including the system level information.

9. The method of claim 8, wherein the file format data comprises data of an ISO Base Media File Format (BMFF) file of the media bitstream.

10. The method of claim 1, wherein parsing the system level information comprises parsing a string including syntax elements having values for the system level information.

11. The method of claim 10, wherein the string includes information indicating one or more of whether the video elementary stream includes one or more of a plurality of SEI message payload types, whether a contained payload type of the SEI messages is signaled, or user defined fields for one or more of the payload types.

12. The method of claim 10, further comprising parsing information indicating whether the string is inherited by system layer information of the media bitstream.

13. A device for retrieving media data, the device comprising one or more processors implemented in circuitry and configured to:

parse system level information of a media bitstream encapsulating a video elementary stream in a video track, the system level information indicating that the video elementary stream includes one or more supplemental enhancement information (SEI) messages and the system level information further indicating payload types for each of the SEI messages, and the system level information being separate from the video track;

extract the one or more SEI messages from the video elementary stream and the payload types from the system level information; and send the one or more SEI messages and the payload types to one or more other processing units of the device.

14. The device of claim 13, wherein the system level information indicates one or more of presence of SEI messages for closed captions in the video elementary stream, whether a unit operating at the system level must be capable of rendering the closed captions, descriptive information for the closed captions, whether multiple sets of closed captions are present in the video elementary stream, mastering color volume information for a high dynamic range (HDR) format, content light level information for the HDR format, color remapping information (CRI) messages for the HDR format, or proprietary information for the HDR format.

15. The device of claim 13, wherein the one or more processors are further configured to determine whether to retrieve the media bitstream based on the system level information.

16. The device of claim 13, wherein the system level information comprises information in one or more of a file format level for a file encapsulating video data of the video elementary stream included in the media bitstream, a manifest file for the media bitstream, an MPEG-2 Transport Stream (TS) level of the media bitstream, a MPEG Media Transport (MMT) level of the media bitstream, or a Dynamic Adaptive Streaming over HTTP (DASH) level of the media bitstream.

17. The device of claim 13, wherein the one or more processors are configured to parse one or more Coding-Independent Code Points (CICP) messages including the system level information.

18. The device of claim 17, wherein to parse the CICP messages, the one or more processors are configured to parse a media presentation description (MPD) including the CICP messages.

19. The device of claim 13, wherein to parse the system level information, the one or more processors are configured to parse a media presentation description (MPD) including one or more Dynamic Adaptive Streaming over HTTP (DASH) descriptors including the system level information.

20. The device of claim 13, wherein to parse the system level information, the one or more processors are configured to parse sample entry information included in file format data, the sample entry information including the system level information.

21. The device of claim 13, wherein to parse the system level information, the one or more processors are configured to comprises parse a string including syntax elements having values for the system level information.

22. A device for retrieving media data, the device comprising:

means for parsing system level information of a media bitstream encapsulating a video elementary stream in a video track, the system level information indicating that the video elementary stream includes one or more supplemental enhancement information (SEI) messages and the system level information further indicating payload types for each of the SEI messages, and the system level information being separate from the video track;

means for extracting the one or more SEI messages from the video elementary stream and the payload types from the system level information; and means for sending the one or more SEI messages and the payload types to one or more processing units of the device.

23. A computer-readable storage medium having stored thereon instructions that, when executed, cause a processor of a device to:

parse system level information of a media bitstream encapsulating a video elementary stream in a video track, the system level information indicating that the video elementary stream includes one or more supplemental enhancement information (SEI) messages and the system level information further indicating payload types for each of the SEI messages, and the system level information being separate from the video track;

extract the one or more SEI messages from the video elementary stream and the payload types from the system level information; and send the one or more SEI messages and the payload types to one or more processing units of the device.

24. A method of transmitting media data, the method comprising:

receiving, by an encapsulation unit of a content preparation device, a video elementary stream from a video encoder of the content preparation device, the video elementary stream including one or more supplemental enhancement information (SEI) messages;

determining, by the encapsulation unit, payload types for each of the one or more SEI messages;

encapsulating, by the encapsulation unit, the video elementary stream in a video track of a media bitstream; and generating, by the encapsulation unit, system level information for the media bitstream, the system level information indicating that the video elementary stream includes the one or more SEI messages and the payload types for each of the SEI messages, and the system level information being separate from the video track.

25. The method of claim 24, wherein the system level information indicates one or more of presence of SEI messages for closed captions in the video elementary stream, whether a unit operating at the system level must be capable of rendering the closed captions, descriptive information for the closed captions, whether multiple sets of closed captions are present in the video elementary stream, mastering color volume information for a high dynamic range (HDR) format, content light level information for the HDR format, color remapping information (CRI) messages for the HDR format, or proprietary information for the HDR format.

26. The method of claim 24, wherein the system level information comprises information in one or more of a file format level for a file encapsulating video data of the video elementary stream included in the media bitstream, a manifest file for the media bitstream, an MPEG-2 Transport Stream (TS) level of the media bitstream, a MPEG Media Transport (MMT) level of the media bitstream, or a Dynamic Adaptive Streaming over HTTP (DASH) level of the media bitstream.

27. The method of claim 24, wherein generating the system level information comprises generating one or more Coding-Independent Code Points (CICP) messages including the system level information.

28. The method of claim 27, wherein generating the CICP messages comprises generating a media presentation description (MPD) including the CICP messages.

29. The method of claim 24, wherein generating the system level information comprises generating a media presentation description (MPD) signaling one or more Dynamic Adaptive Streaming over HTTP (DASH) descriptors including the system level information.

30. The method of claim 24, wherein generating the system level information comprises generating sample entry information included in file format data, the sample entry information including the system level information.

31. The method of claim 30, wherein the file format data comprises data of an ISO Base Media File Format (BMFF) file of the media bitstream.

32. The method of claim 24, wherein generating the system level information comprises generating a string including syntax elements having values for the system level information.

33. The method of claim 32, wherein the string includes information indicating one or more of whether the video elementary stream includes one or more of a plurality of SEI message payload types, whether a contained payload type of the SEI messages is signaled, or user defined fields for one or more of the payload types.

34. The method of claim 32, further comprising generating information indicating whether the string is inherited by system layer information of the media bitstream.

35. A device for transmitting media data, the device comprising one or more processors implemented in circuitry and configured to:
receive a video elementary stream from a video encoder, the video elementary stream including one or more supplemental enhancement information (SEI) messages;
determine payload types for each of the one or more SEI messages;
encapsulate the video elementary stream in a video track of a media bitstream; and
generate system level information for the media bitstream, the system level information indicating that the video elementary stream includes the one or more SEI messages and the payload types for each of the SEI messages, and the system level information being separate from the video track.

36. The device of claim 35, wherein the system level information indicates one or more of presence of SEI messages for closed captions in the video elementary stream, whether a unit operating at the system level must be capable of rendering the closed captions, descriptive information for the closed captions, whether multiple sets of closed captions are present in the video elementary stream, mastering color volume information for a high dynamic range (HDR) format, content light level information for the HDR format, color remapping information (CRI) messages for the HDR format, or proprietary information for the HDR format.

37. The device of claim 35, wherein the system level information comprises information in one or more of a file format level for a file encapsulating video data of the video elementary stream included in the media bitstream, a manifest file for the media bitstream, an MPEG-2 Transport Stream (TS) level of the media bitstream, a MPEG Media Transport (MMT) level of the media bitstream, or a Dynamic Adaptive Streaming over HTTP (DASH) level of the media bitstream.

38. The device of claim 35, wherein to generate the system level information, the one or more processors are configured to generate one or more Coding-Independent Code Points (CICP) messages including the system level information.

39. The device of claim 38, wherein the one or more processors are configured to generate a media presentation description (MPD) including the CICP messages.

40. The device of claim 35, wherein the one or more processors are configured to generate a media presentation description (MPD) signaling one or more Dynamic Adaptive Streaming over HTTP (DASH) descriptors including the system level information.

41. The device of claim 35, wherein the one or more processors are configured to generate sample entry information included in file format data, the sample entry information including the system level information.

42. The device of claim 41, wherein the file format data comprises data of an ISO Base Media File Format (BMFF) file of the media bitstream.

43. The device of claim 35, wherein the one or more processors are configured to generate a string including syntax elements having values for the system level information.

44. A device for transmitting media data, the device comprising:
means for receiving a video elementary stream from a video encoder, the video elementary stream including one or more supplemental enhancement information (SEI) messages;
means for determining payload types for each of the one or more SEI messages;
means for encapsulating the video elementary stream in a video track of a media bitstream; and
means for generating system level information for the media bitstream, the system level information indicating that the video elementary stream includes the one or more SEI messages and the payload types for each of the SEI messages, and the system level information being separate from the video track.

45. A computer-readable storage medium having stored thereon instructions that, when executed, cause a processor to:
receive a video elementary stream from a video encoder, the video elementary stream including one or more supplemental enhancement information (SEI) messages;
determine payload types for each of the one or more SEI messages;
encapsulate the video elementary stream in a video track of a media bitstream; and
generate system level information for the media bitstream, the system level information indicating that the video elementary stream includes the one or more SEI messages and the payload types for each of the SEI messages, and the system level information being separate from the video track.

* * * * *